United States Patent
Davis et al.

(10) Patent No.: US 8,265,594 B2
(45) Date of Patent: *Sep. 11, 2012

(54) METHOD FOR BYPASSING PASSKEY EXCHANGE AND AUTHENTICATION PROCEDURES

(75) Inventors: Mark T. Davis, San Francisco, CA (US); David Kammer, Seattle, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/336,366

(22) Filed: Dec. 16, 2008

(65) Prior Publication Data
US 2009/0094686 A1    Apr. 9, 2009

Related U.S. Application Data

(63) Continuation of application No. 10/083,217, filed on Feb. 25, 2002, now Pat. No. 7,474,888.

(51) Int. Cl.
*H04M 1/66* (2006.01)

(52) U.S. Cl. ....... 455/410; 455/411; 455/41.2; 455/566; 370/338

(58) Field of Classification Search .................. 455/410, 455/411, 434, 41.2, 552.1, 553.1, 566, 423, 455/425; 370/338
See application file for complete search history.

(56) References Cited

U.S. PATENT DOCUMENTS

| | | | |
|---|---|---|---|
| 5,465,392 A | 11/1995 | Baptist et al. | |
| 6,112,078 A | 8/2000 | Sormunen et al. | |
| 6,574,455 B2 | 6/2003 | Jakobsson et al. | |
| 6,600,902 B1 | 7/2003 | Bell | |
| 6,721,555 B1 | 4/2004 | Phillips et al. | |
| 6,766,160 B1 | 7/2004 | Lemilainen et al. | |
| 7,249,188 B2 | 7/2007 | Spicer et al. | |
| 2001/0028298 A1* | 10/2001 | Liden et al. | 340/5.65 |
| 2001/0036273 A1 | 11/2001 | Yoshizawa | |
| 2002/0109706 A1* | 8/2002 | Lincke et al. | 345/700 |
| 2003/0011467 A1 | 1/2003 | Suomela | |
| 2003/0204748 A1 | 10/2003 | Chiu | |
| 2004/0103205 A1* | 5/2004 | Larson et al. | 709/229 |
| 2004/0203354 A1* | 10/2004 | Yue | 455/41.1 |
| 2005/0055627 A1 | 3/2005 | Lloyd et al. | |

* cited by examiner

*Primary Examiner* — Marcos Torres

(57) ABSTRACT

A method and system thereof for establishing a wireless connection to a device while bypassing passkey exchange and authentication procedures. Passkeys are authenticated and exchanged with another device. At the user's discretion, the passkey for the other device can be stored in memory. In the case in which the passkey is stored, the other device is considered a "trusted device." Subsequently, when a trusted device is discovered and selected, and a wireless connection to the trusted device is made, the passkey for the trusted device is automatically retrieved from memory. As such, it is not necessary for the user to manually input a passkey or for the devices to perform a passkey exchange and authentication procedure.

12 Claims, 6 Drawing Sheets

METHOD FOR BYPASSING PASSKEY EXCHANGE AND AUTHENTICATION PROCEDURES

RELATED U.S. PATENT APPLICATION

This application is a Continuation Application of the commonly-owned U.S. patent application with Ser. No. 10/083,217, now U.S. Pat. No. 7,474,888, filed Feb. 25, 2002, by M. Davis et al., and entitled "Method for Bypassing Passkey Exchange and Authentication Procedures," which is hereby incorporated by reference in its entirety.

BACKGROUND OF THE INVENTION

1. Field of the Invention

The present invention relates to the field of wireless devices. Specifically, the present invention relates to a method and system for establishing a wireless connection between such devices without repeating passkey exchange and authentication procedures.

2. Related Art

Computer systems and other types of consumer electronic devices are commonly linked to each other and to peripheral devices using a myriad of different types of cables and connectors. As these devices grow in number and variety, their cables and connectors can often become quite cumbersome to work with. Accordingly, efforts are underway to develop technologies allowing hardware connections to be replaced with wireless ones.

One such technology is the BLUETOOTH technology. BLUETOOTH is the code name for a technology specification for short-range radio links that will allow the many proprietary cables that connect devices to one another to be replaced with short-range radio links.

The BLUETOOTH technology is based on a high-performance, yet low-cost, integrated radio transceiver. For instance, BLUETOOTH transceivers built into both a cellular telephone and a laptop computer system would replace the cables used today to connect a laptop to a cellular telephone. Printers, personal digital assistants (hand-held computer systems and the like), desktop computer systems, fax machines, keyboards, joysticks and virtually any other digital device can be part of a BLUETOOTH system. BLUETOOTH radio technology can also provide a universal bridge to existing data networks and a mechanism to form small private ad hoc groupings of connected devices away from fixed network infrastructures.

The BLUETOOTH technology allows BLUETOOTH devices to "discover" other BLUETOOTH devices that are within range and then connect with those devices, either automatically or at a user's discretion. The Generic Access Profile (GAP) of the known BLUETOOTH specification describes the processes by which BLUETOOTH devices discover and connect with each other.

The BLUETOOTH GAP also describes security aspects that are implemented as part of establishing a connection between devices. Different security levels or modes can be used depending on the security requirements of the requested channel or service. In general, increased security levels include the exchange and authentication of a passkey (or link key) between connecting devices.

To connect with a device using a passkey, first the user initiates the BLUETOOTH discovery process. During the discovery process, discoverable BLUETOOTH devices make their presence known to each other and exchange attributes (e.g., addresses) needed to further the connection process. Also, user-friendly names are exchanged to help a user identify BLUETOOTH devices that are in the environment.

The user can then select a device to connect with and initiate the BLUETOOTH connection process. In those cases in which passkeys are required, a passkey is entered for each of the respective devices, and the passkeys are exchanged. The passkeys are then authenticated, in which case the devices can proceed with an exchange of information or services commensurate with the security level in force.

The prior art is problematic for a number of reasons. First, the users must manually enter the passkeys as part of the connection process, which can reduce the quality of the user experience. Second, the users must wait until the passkey exchange and authentication procedures are completed before the devices can interact. The wait may be inconvenient and perhaps even vexing to users.

Therefore, what is needed is a system and/or method that can be used to streamline the connection process between devices. What is also needed is a system and/or method that can satisfy the above need and that can provide a desired level of security. In addition, what is needed is a system and/or method that can satisfy the above needs and that can be implemented on BLUETOOTH devices (that is, consistent with the standards of the BLUETOOTH specification). The present invention provides these advantages and others not specifically mentioned above.

SUMMARY OF THE INVENTION

Embodiments of the present invention provide a method and system thereof that can be used to streamline the connection process between devices while providing a desired level of security. Embodiments of the present invention can be implemented on BLUETOOTH devices (that is, consistent with the standards of the BLUETOOTH specification).

The present invention pertains to a method and system thereof for establishing a wireless connection to a device while bypassing passkey exchange and authentication procedures. According to the present embodiment of the present invention, passkeys are authenticated and exchanged with another device. At the user's discretion, the passkey for the other device can be stored in memory. In the case in which the passkey is stored, the other device is considered a "trusted device" and is referred to as such herein.

Subsequently, in accordance with the present invention, when a trusted device is discovered and selected, and a wireless connection to the trusted device is made, the passkey for the trusted device is automatically retrieved from memory. As such, it is not necessary for the user to manually input a passkey or for the devices to perform a passkey exchange and authentication procedure.

In one embodiment, the discovery of available devices, and the connection to an available device, is performed according to BLUETOOTH protocols.

In another embodiment, a list of the available devices is displayed. In one such embodiment, a trusted device is identifiable as such in the list. For example, a particular type of icon can be placed next to each trusted device in the list, to distinguish trusted devices from other devices in the list.

In yet another embodiment, a list of trusted devices can be displayed. In one such embodiment, devices can be deleted from this list; devices deleted from the list are no longer considered trusted devices.

Thus, according to the present invention, it not necessary to go through passkey exchange and authentication procedures each time certain kinds of wireless connections are made (specifically, those kind of wireless connections in which a certain level of access to information and data is to be allowed). It is also not necessary for a user to manually enter the passkey each time those types of connections are made with trusted devices. These and other objects and advantages of the present invention will become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "discovering" or "receiving" or "connecting" or "using" or "displaying" or "storing" or "deleting" or the like, refer to the action and processes of a computer system (e.g., processes 300 and 400 of FIGS. 3 and 4, respectively), or similar electronic computing device, that manipulates and transforms data represented as physical (electronic) quantities within the computer system's registers and memories into other data similarly represented as physical quantities-within the computer system memories or registers or other such information storage, transmission or display devices.

Figure 1:
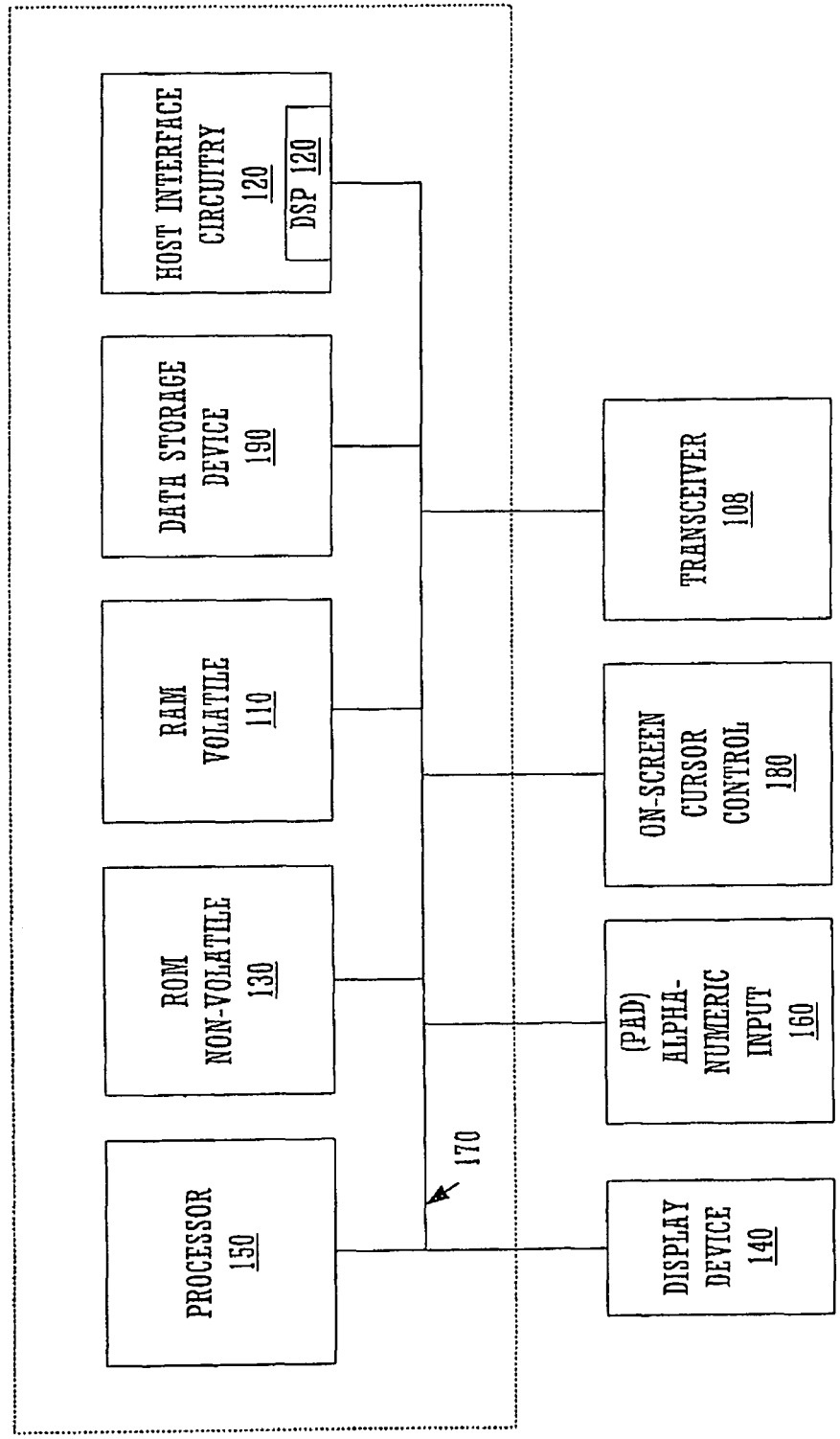
FIG. 1 is a block diagram of an exemplary device upon which embodiments of the present invention may be practiced.

FIG. 1 is a block diagram of one embodiment of a device 100 upon which embodiments of the present invention may be implemented. In one embodiment, device 100 is a handheld computer system often referred to as a personal digital assistant (PDA) or a portable information device (PID). In another embodiment, device 100 is another type of intelligent electronic device such as a cell phone. In its various implementations, device 100 may not include all of the elements illustrated by FIG. 1, or device 100 may include other elements not described by FIG. 1.

In one embodiment, device 100 includes an address/data bus 170 for communicating information, a central processor 150 coupled with the bus 170 for processing information and instructions, a volatile memory 110 (e.g., random access memory, RAM) coupled with the bus 170 for storing information and instructions for the central processor 150, and a non-volatile memory 130 (e.g., read only memory, ROM) coupled with the bus 170 for storing static information and instructions for the processor 150. In the present embodiment, device 100 also includes an optional data storage device 190 (e.g., a Secure Digital card, a Multi Media Card, or the like) coupled with the bus 170 for storing information and instructions. Device 190 can be removable. In one embodiment, device 100 also contains a display device 140 coupled to the bus 170 for displaying information to a user.

In the present embodiment, device 100 also includes a signal transmitter/receiver (transceiver) device 108, which is coupled to bus 170 for providing a wireless radio (RF) communication link between device 100 and other wireless devices. In one embodiment, transceiver 108 is compliant with the known BLUETOOTH specification. Transceiver 108 may be coupled to device 100 or integral with device 100.

In one embodiment, device 100 includes host interface circuitry 120 coupled to bus 170. Host interface circuitry 120 includes an optional digital signal processor (DSP) 122 for processing data to be transmitted or data that are received via transceiver 108. Alternatively, processor 150 can perform some or all of the functions performed by DSP 122.

In one embodiment, device 100 also includes an optional alphanumeric input device 160 that, in one implementation, is a handwriting recognition pad ("digitizer"). Alphanumeric input device 160 can communicate information and command selections to processor 150 via bus 170. In one implementation, alphanumeric input device 160 is a touch screen device; in this implementation, alphanumeric input device 160 is capable of registering a position where a stylus element (not shown) makes contact. In other implementations, alphanumeric input device 160 is a keyboard or similar device.

In one embodiment, device 100 also includes an optional cursor control or directing device (on-screen cursor control 180) coupled to bus 170 for communicating user input information and command selections to processor 150. In one implementation, on-screen cursor control device 180 is a touch screen device incorporated with display device 140. In this implementation, on-screen cursor control device 180 is capable of registering a position on display device 140 where a stylus element makes contact. The display device 140 utilized with device 100 may be a liquid crystal display (LCD)

device, a cathode ray tube (CRT), a field emission display device (also called a flat panel CRT), or other display device suitable for generating graphic images and alphanumeric characters recognizable to the user.

Figure 2:
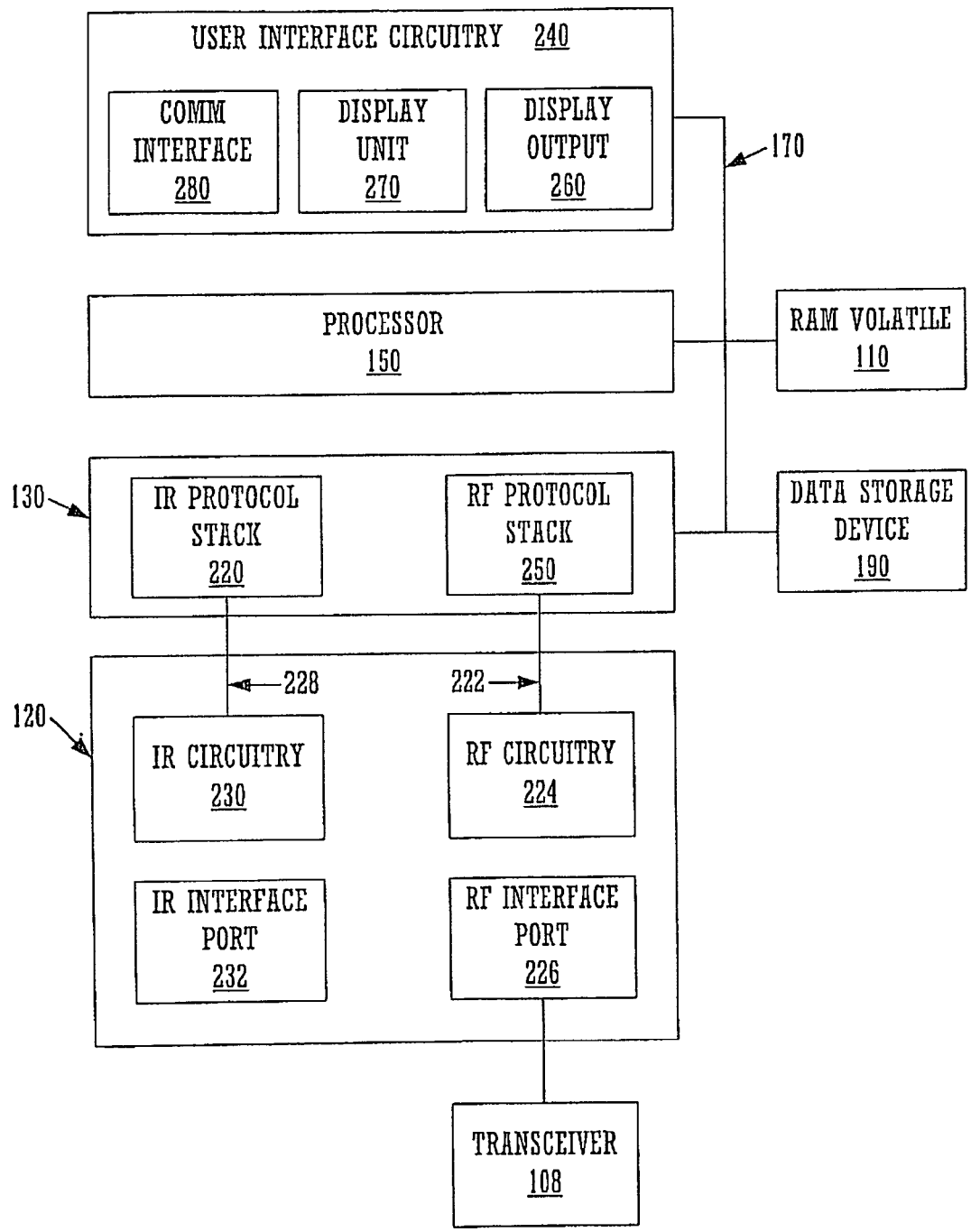
FIG. 2 is a block diagram showing features of the device of FIG. 1 in accordance with one embodiment of the present invention.

FIG. 2 is a block diagram showing additional features of device 100 in accordance with one embodiment of the present invention. In this embodiment, user interface circuitry 240 is coupled to processor 150 via bus 170. User interface circuitry includes hardware and software components that provide user input and output resources for functions performed by processor 150. In the present embodiment, user interface circuitry 240 includes a display output 260, a display input 270, and communication interface 280.

In the present embodiment, display output 260 receives digital information representing graphical information from processor 150, and converts the information to a graphical display, such as text and/or images, for display on display device 140 (FIG. 1), for example. Display input 270 may receive data inputs, such as graphical data inputs, from a user. The graphical data inputs can be entered by the user with a stylus element on the pressure-sensitive display device 140 (specifically, on-screen cursor control device 180, FIG. 1) or the alphanumeric input device 160 (FIG. 1).

In one embodiment, the communication interface 280 allows the user to enter other types of data, such as audio or video data, or data formatted for operation with particular applications executed by device 100, such as calendar data, electronic mail data, word processing, databases, and the like. In one embodiment, the communication interface 280 is a serial communication port, but could also alternatively be of any of a number of well-known communication standards and protocols, e.g., parallel, SCSI (small computer system interface), Firewire (IEEE 1394), Ethernet, etc.

In the present embodiment, host interface circuitry 120 is coupled to processor 150 via bus 170. Host interface circuitry 120 (or link interface circuitry or data interface circuitry) illustrates, but is not limited to, two alternative link interface ports for establishing a wireless link to another device: an RF interface port 226 and an infrared (IR) interface port 232.

In the present embodiment, RF circuitry 224 converts signals to radio frequency output and accepts radio frequency input via RF interface port 226. In a BLUETOOTH embodiment, RF interface port 226 is a BLUETOOTH transceiver. RF signals received by RF circuitry 224 are converted to electrical signals and relayed to RF protocol stack 250 via connection 222.

In the present embodiment, IR circuitry 230 converts signals into infrared output and accepts infrared input via IR interface port 232. Infrared communication signals received by IR circuitry 230 are converted to electrical signals that are relayed to IR protocol stack 220 via connection 228.

Processor 150 is capable of executing RF protocol stack 250 and IR protocol stack 220. IR stack 220 implements an IR protocol to support infrared links with other devices.

Figure 3:
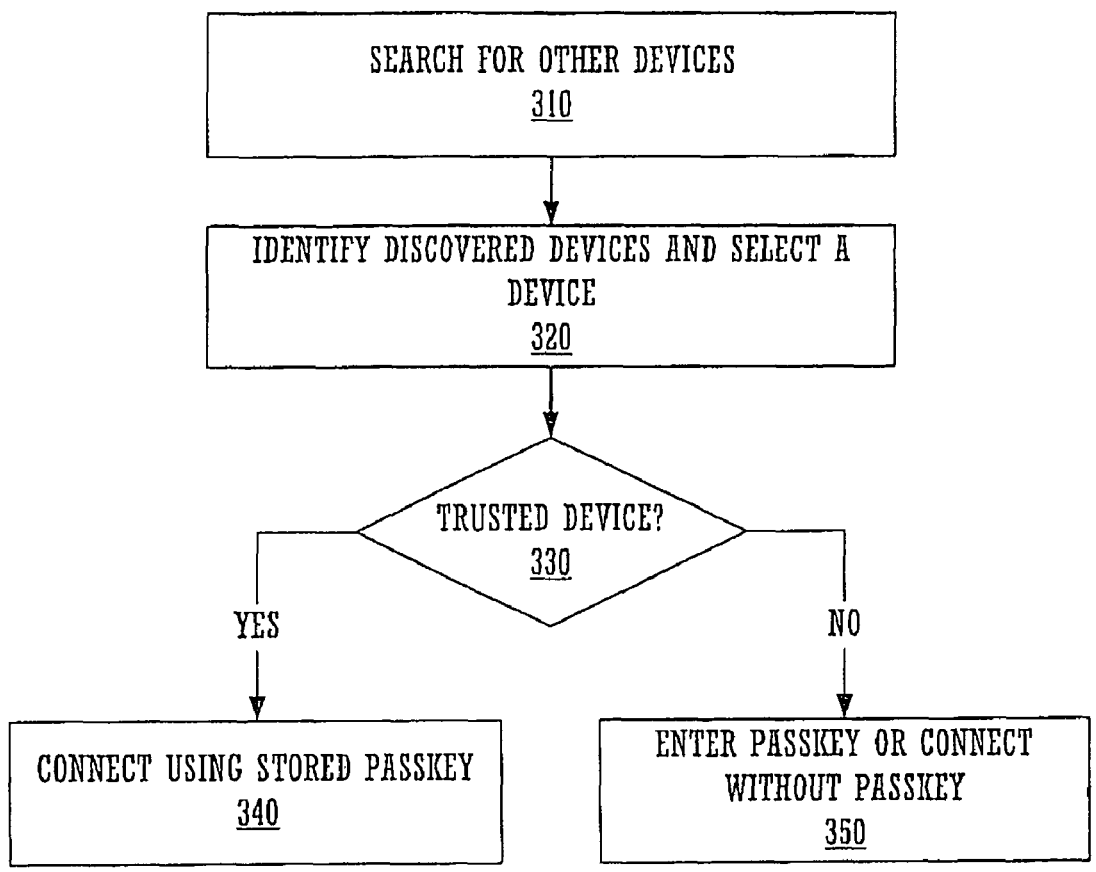
FIG. 3 is a flowchart of a process for connecting with another device in accordance with one embodiment of the present invention.
Figure 4:
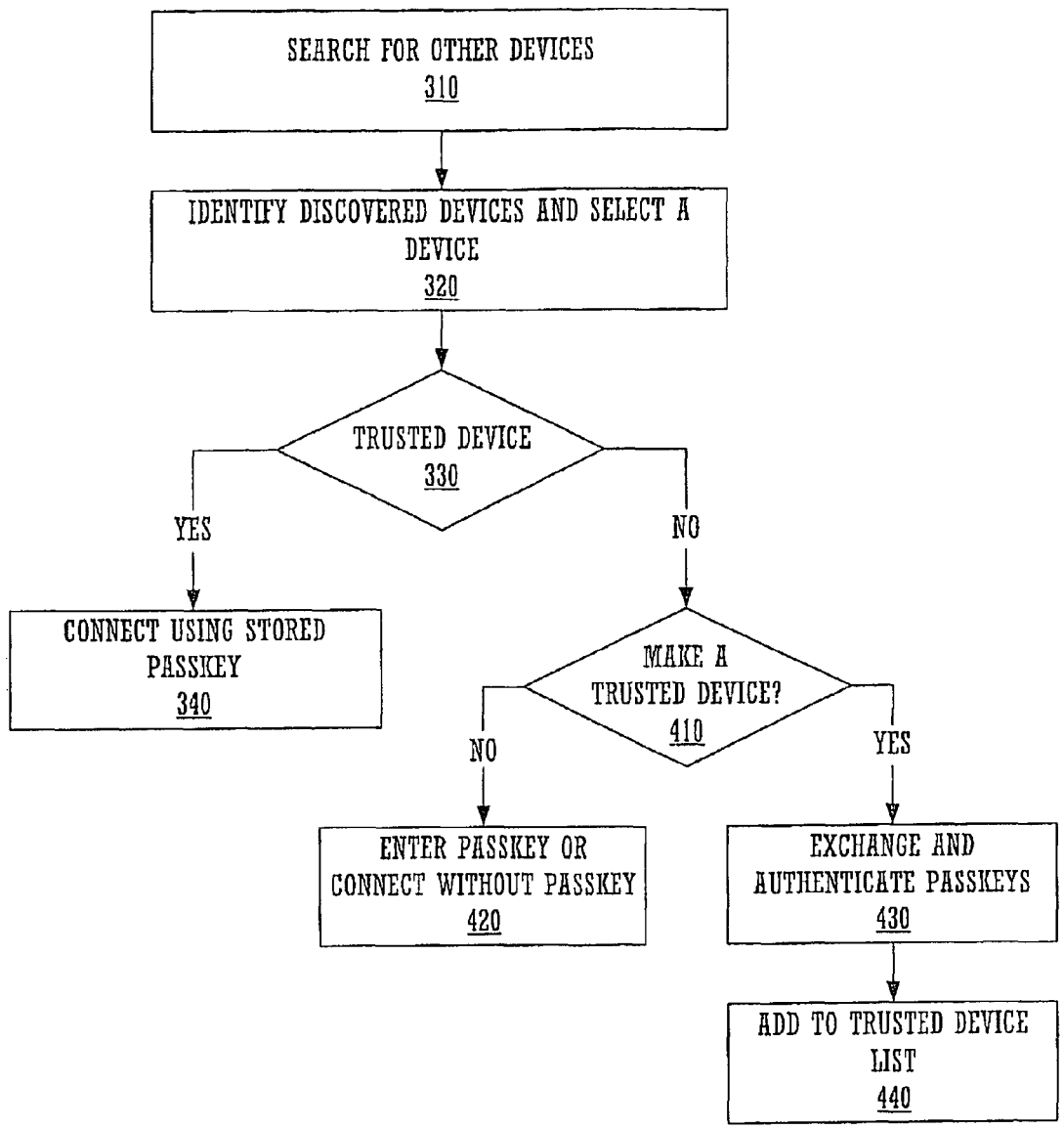
FIG. 4 is a flowchart of a process for making a device a trusted device in accordance with one embodiment of the present invention.

FIG. 3 is a flowchart of a process 300 for connecting with another device in accordance with one embodiment of the present invention. FIG. 4 is a flowchart of a process 400 for making a device a trusted device in accordance with another embodiment of the present invention. In the various embodiments of the present invention, processes 300 and 400 are implemented by device 100 (FIG. 1) as computer-readable program instructions stored in a memory unit (e.g., ROM 130, RAM 110 or data storage device 190 of FIG. 1) and executed by a processor (e.g., processor 150 of FIG. 1). Although specific steps are disclosed in FIGS. 3 and 4, such steps are exemplary. That is, embodiments of the present invention are well suited to performing various other steps or variations of the steps recited in FIGS. 3 and 4. It is appreciated that the steps in FIGS. 3 and 4 may be performed in an order different than presented, and that not all of the steps in FIGS. 3 and 4 may be performed.

With reference first to FIG. 3, the exemplary steps in process 300 are described. In step 310, in the present embodiment, a discovery process for discovering other devices within communication range is initiated by device 100. Discovery processes are known in the art.

In one embodiment (a BLUETOOTH embodiment), device 100 is a BLUETOOTH device. As used herein, a BLUETOOTH device is a device equipped with a wireless transceiver that can broadcast and receive signals in the radio frequency range specified by the BLUETOOTH specification, and that implements protocols and processes in substantial compliance with the BLUETOOTH specification. In the BLUETOOTH embodiment, a discovery process substantially compliant with the known BLUETOOTH specification is used to discover other BLUETOOTH devices. The discovery process used by BLUETOOTH devices is known in the art. In the BLUETOOTH embodiment, in step 310, discoverable BLUETOOTH devices make their presence known to each other.

In step 320, in the present embodiment, the devices that were discovered in step 310 exchange attributes and information (such as device addresses) needed to further the connection process. In one embodiment (including the BLUETOOTH embodiment), the devices exchange user-friendly names that assist a user in identifying which devices have been discovered. A list of the user-friendly names is typically presented to the user (e.g., the list is displayed using device 100). The user can then select a device from the list and initiate a connection between device 100 and the selected device.

In step 330, according to the present embodiment of the present invention, a determination is made as to whether the selected device (the device to be connected with) is a "trusted device" or a "non-trusted device." In accordance with the present invention, if the device is a trusted device, this means that authenticated passkeys (also referred to as link keys) were previously exchanged between the device and device 100 and stored in memory. The process by which a device becomes a trusted device is described in conjunction with FIG. 4, below.

According to the present invention, trusted devices are readily identifiable as such to the user. In one embodiment, in the list of user-friendly names presented to the user, the trusted devices are uniquely identified as such. For example, a particular type of icon can be placed next to the name of each trusted device. Thus, trusted devices are readily distinguishable from other (e.g., non-trusted) devices.

In step 340, according to the present embodiment of the present invention, if the device to be connected with is a trusted device, then the connection between that device and device 100 is made using the authenticated passkeys stored in memory. In one embodiment, the passkeys are automatically retrieved from memory and used. In one embodiment, the connection process is substantially compliant with the BLUETOOTH specification.

Thus, according to the present invention, it is not necessary to manually enter a passkey for trusted devices, not is it necessary to go through the passkey exchange and authentication procedures with trusted devices. Although the connection process is thereby streamlined, the desired level of security is maintained.

In step 350, if the device is not a trusted device, the connection between devices can be made by manually entering a passkey for each device (the passkeys are exchanged and authenticated). Alternatively, if for example the service or application does not require a certain level of security, the connection can be made without passkeys.

With reference now to FIG. 4, the exemplary steps in process 400 are described. For brevity of discussion, a description of steps 310, 320, 330 and 340 is not repeated here; those steps are described above.

In step 410, a user may select a non-trusted device for a connection. In one embodiment, the user is then given the option of making the selected device a trusted device prior to making the connection. However, the user can also make the selected device a trusted device at a later time.

In step 420, if the user decides to not make the selected device a trusted device, the connection between devices can be made by manually entering passkeys, or the connection can be made without passkeys.

In step 430, in the present embodiment, if the decision is made to make the selected device a trusted device, then passkeys are entered, exchanged and authenticated. In one embodiment, the passkeys are exchanged and authenticated substantially according to the BLUETOOTH specification.

In step 440, after authentication of the passkeys, the device is characterized as a trusted device. Accordingly, in one embodiment, the device is added to a list of trusted devices and its authenticated passkey is stored in memory. The connection process then proceeds to make a connection between the device and device 100 using the authenticated passkeys. In subsequent connection attempts for these two devices, it is not necessary for the passkeys to be entered; instead, they are retrieved from memory and used as described above.

In one embodiment, the list of trusted devices can be presented (displayed) to a user at the user's behest, allowing the user to readily edit the list. For example, the user can delete a device from the list by selecting the device and entering a delete command.

In one embodiment, the passkeys stored in memory for trusted devices can be set to expire at a particular time and/or date, so that the passkeys are valid only for a specified period of time.

Figure 5A:
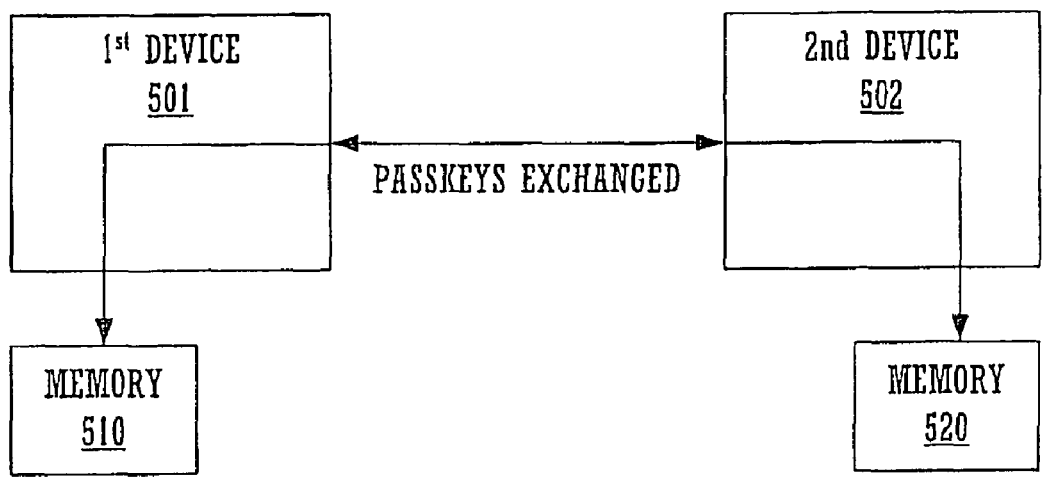
FIGS. 5A and 5B are data flow diagrams showing the handling of passkeys for trusted devices according to one embodiment of the present invention.
Figure 5B:
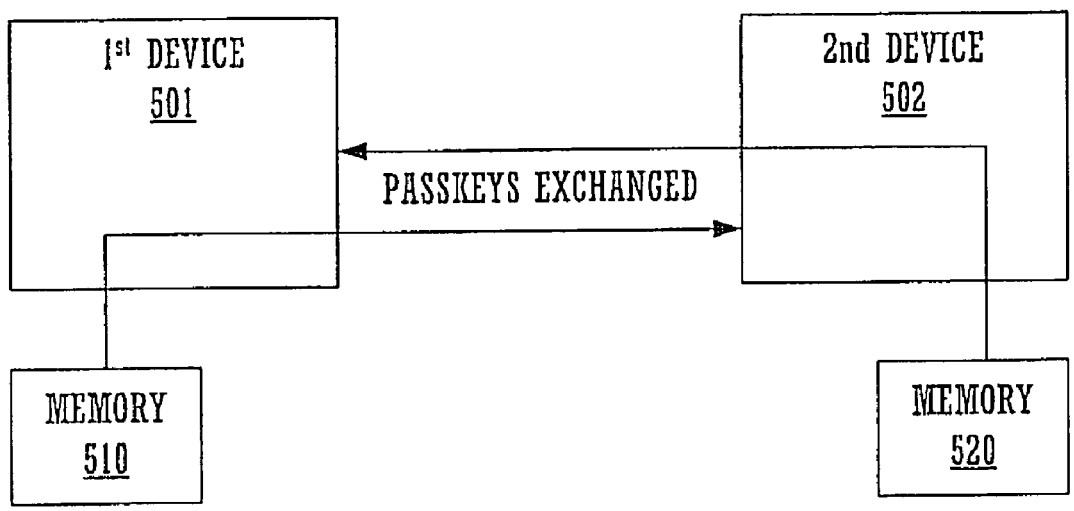

FIGS. 5A and 5B are data flow diagrams showing the handling of passkeys for trusted devices according to one embodiment of the present invention. In FIG. 5A, first device 501 and second device 502 exchange and authenticate passkeys. According to the present embodiment of the present invention, first device 501 stores the passkey from second device 502 in memory 510, and second device 502 stores the passkey from first device 501 in memory 520. In FIG. 5B, during a subsequent connection attempt in accordance with the present embodiment of the present invention, first device 501 retrieves the passkey for second device 502 from memory 510, and second device 502 likewise retrieves the passkey for first device 501 from memory 520. These passkeys can then be used to set up a connection having a desired security level, without having to perform a passkey exchange and authentication process.

Thus, in summary, embodiments of the present invention provide a method and system thereof that can be used to streamline the connection process between devices while providing a desired level of security. Embodiments of the present invention can be implemented on BLUETOOTH devices (that is, consistent with the standards specified by the BLUETOOTH specification).

The preferred embodiment of the present invention, a method for bypassing passkey exchange and authentication procedures, is thus described. While the present invention has been described in particular embodiments, it should be appreciated that the present invention should not be construed as limited by such embodiments, but rather construed according to the below claims.

What is claimed is:

1. A computer-implemented method comprising:
identifying available devices within wireless range;
displaying a first list of the available devices, the first list identifying devices for which passkeys are stored in memory;
receiving a selection of a device, wherein said device is one of said available devices;
connecting wirelessly with said device;
accessing information that identifies said device as a trusted device or a non-trusted device;
as a result of identifying said device as a trusted device, automatically using a passkey for said device to make a wireless connection with said device, wherein said passkey for said device is retrieved from memory and wherein manual input of said passkey is obviated;
as a result of identifying the device as a non-trusted device, receiving a passkey for the device to make a wireless connection with said device, wherein the passkey for the device is stored in memory and the device is identified as trusted on a second list, the second list different than the first list; and
displaying the second list on a display device, the second list comprising trusted devices and non-trusted devices and information that distinguishes trusted devices from non-trusted devices including said information designating said device as a trusted device.

2. The method as recited in claim 1 comprising:
receiving said passkey for said device at a time prior to connecting; and
storing said passkey.

3. The method as recited in claim 1 comprising:
deleting a device from the second list.

4. The method as recited in claim 1 wherein said passkey is valid only for a specified period of time.

5. A system comprising:
a display device;
a transceiver coupled with said display device;
a memory coupled with said display device; and
a processor coupled with said display device, the processor to:
identify available devices within wireless range;
display a first list of said available devices, the first list identifying devices for which passkeys are stored in memory;
receive a selection of a device, wherein said device is one of said available devices;
access information that identifies said device as a trusted device or a non-trusted device;
as a result of identifying said device as a trusted device, the processor to connect wirelessly with said device, the processor to automatically use a passkey for said device to make a wireless connection with said device, wherein said passkey for said device is retrieved from memory and wherein manual input of said passkey is obviated;
as a result of identifying said device as a non-trusted device, the processor to receive a passkey for said device to make a wireless connection with said device, wherein said passkey for said device is stored in memory and said device is identified as trusted on a second list, the second list different than the first list; and display the second list on the display device, the second list comprising trusted devices and non-trusted devices and information that distinguishes trusted devices from non-trusted devices including said information designating said device as a trusted device.

6. The system of claim 5 wherein the processor is to:
receive said passkey for said device at a time prior to said connecting; and
store said passkey.

7. The system of claim 5 wherein the processor is to:
delete a device from the second list.

8. The system of claim 5 wherein said passkey is valid only for a specified period of time.

9. A non-transitory computer-usable medium having computer-readable code stored thereon that when executed causes a processor to:
identify available devices within wireless range;
display a first list of the available devices, the first list identifying devices for which passkeys are stored;
receive a selection of another device, wherein said other device is one of said available devices;
connect wirelessly with said other device;
access information that identifies said device as a trusted device;
as a result of identifying said device as a trusted device, the processor to automatically use a passkey for said device to make a wireless connection with said device, wherein said passkey for said device is retrieved from memory and wherein manual input of said passkey is obviated;
as a result of identifying the device as a non-trusted device, the processor to receive a passkey for the device to make a wireless connection with the device, wherein the passkey for the device is stored in memory and the device is identified as trusted on a second list, the second list different than the first list; and
display the second list on a display device, the second list comprising trusted devices and non-trusted devices and information that distinguishes trusted devices from non-trusted devices including said information designating said device as a trusted device.

10. The computer-usable medium of claim 9 wherein said computer-readable program code further causes the processor to:
receive said passkey for said other device at a time prior to said connecting; and
store said passkey.

11. The computer-usable medium of claim 9 wherein said computer-readable program code further causes the processor to:
delete a device from the second list.

12. The computer-usable medium of claim 9 wherein said passkey is valid only for a specified period of time.

* * * * *